Jan. 6, 1970   C. D. KEITH ETAL   3,488,147
PREPARATION OF ALUMINA BY HYDROLYSIS OF ALUMINUM
Filed June 1, 1965
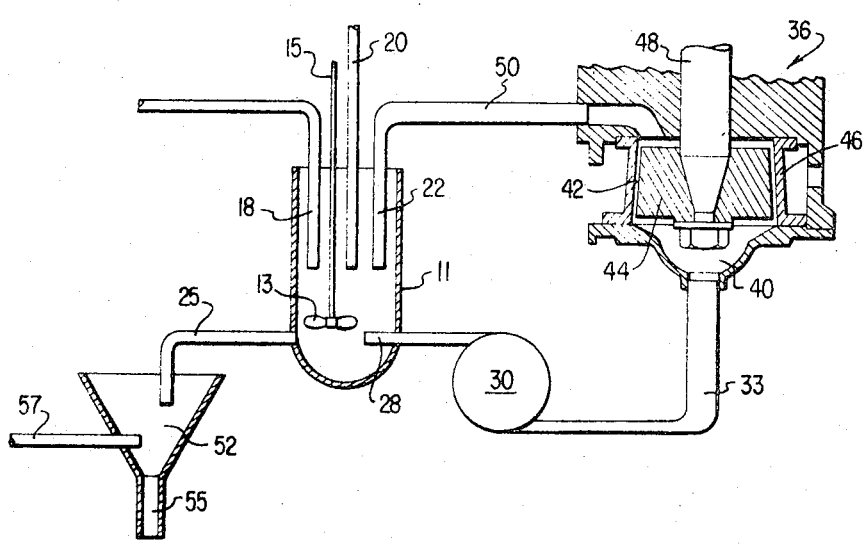
INVENTORS.
CARL D. KEITH
KURT W. CORNELY
BY *McLean Morton & Boustead*
ATTORNEYS.

United States Patent Office 3,488,147
Patented Jan. 6, 1970

3,488,147
PREPARATION OF ALUMINA BY HYDROLYSIS
OF ALUMINUM
Carl D. Keith, Summit, N.J., and Kurt W. Cornely,
Syosset, N.Y., assignors to Engelhard Industries, Inc.
Filed June 1, 1965, Ser. No. 460,152
Int. Cl. C01f 7/34
U.S. Cl. 23—143                        13 Claims

ABSTRACT OF THE DISCLOSURE

Hydrous alumina is made by reaction of water and aluminum of about 2 to 100 microns in size. In order to carry the reaction to near completion the reaction mixture is scoured until substantially all particles have a size less than 50 microns. The reaction mixture scoured preferably has at least 5% of aluminum-containing particles larger than 50 microns in size, and the particle size reduction is made by withdrawing a portion of the reaction mixture from the reaction zone, subjecting the withdrawn material to scouring and subsequently returning it to the reaction zone. A colloid mill is advantageously employed to scour, and the volume of material milled is at least about 10 times the volume of the reaction mixture. The aluminum starting material can have a surface area of about 75,000 to 1,000,000 square millimeters per gram, and the reaction can be conducted at either an acid or basic pH.

---

This invention is concerned with the production of alumina hydrate from aluminum and in particular to a process whereby the alumina product is relatively uncontaminated with unreacted aluminum metal.

In our copending applications, Ser. Nos. 416,891 now Patent 3,429,660 and 416,902 filed Dec. 8, 1964, and incorporated herein by reference, methods are presented wherein aluminum metal is reacted with water to produce aluminum oxide. These methods employ aluminum metal of very high surface area which usually is in a state of extremely fine sub-division, often about 5–50 microns in size. While the reaction of the metal often goes to 100% completion, there still are some occasions where aluminum metal appears in the reaction product and must be removed; for example, where a significant amount of the aluminum metal starting material, say about 5% or more, will not pass a 325 mesh (44 micron) sieve. Some of the aluminum particles may be larger than 230 or 270 mesh sieve (62 or 53 microns, respectively). Also, securing a desired proportion of alumina trihydrate modifications in the product may indicate the use of reaction conditions which give less than complete reaction, and the reaction product mixture often may have up to about 15 or 20% unreacted aluminum, say about 0.5 to 10%. In such situation, unreacted aluminum can be entrained in the aqeous alumina hydrate and even in those situations where the unreacted aluminum, which is generally more dense than the hydrate, can be readily disentrained and removed by decantation, the unreacted aluminum which settles out often will carry a large or small amount of the desired alumina hydrate product with it, thus reducing the yields from the process.

It has now been discovered that a scouring treatment of the aluminum metal-water reaction mixture during or after the reaction enables recovery of 95% or better of the desired alumina hydrate essentially free of unreacted aluminum. The materials may be conveniently separated by gravitational separation procedures. In a preferred procedure and with a properly designed settling tank, 99% or more of the alumina hydrate may be recovered. Before the treatment of the present invention, the conversion of the aluminum to alumina may often be less than 95 weight percent and the reaction may be in essence stopped. If desired, of course, the treatment can be employed before the initial reaction is slowed to a considerable extent. In any event, after the treatment the aluminum is more than 95 weight percent, preferably at least 99%, converted to hydrous alumina and the hydrous alumina is readily separated by gravity in a relatively pure state, i.e. essentially free of unreacted aluminum.

The process of this invention is applicable to mixtures of aluminum metal and aqueous alumina hydrate which result from reacting water with finely divided aluminum metal and which contain at least 1 weight percent, often at least 5%, solid aluminum-containing particles larger than 50 microns in size. The major portion of large particles may vary in size up to about 88 or even 100 or more microns and the process of this invention is particularly applicable to such mixtures containing more than 1% particles greater than about 74 microns. The particles may contain both free aluminum and alumina. In the process, the mixture is treated until it contains substantially no particles of 50 or more microns, preferably less than 1% of particles are larger than 44 microns.

Advantageously, essentially all particles remaining in the reaction mixture after the scouring treatment of this invention are of a size whereby they will pass a 325 mesh sieve, i.e. are less than 44 microns in size. It has been found that when the scouring method of this invention is practiced on a mixture suitable for reaction, for example, practiced on the mixture during reaction or at least before temperature, pH, etc., conditions conducive to reaction have been lost, one of the results is to push the reaction further toward completion. Thus the effectiveness of the scouring procedure may be measured by an improvement in the extent of reaction.

The scouring may usually be readily obtained by any one of a number of known procedures. Generally a portion of the reaction mixture will be removed from the reaction vessel, passed to a milling device, preferably a mill of the colloid type, and returned to the reaction vessel. Often the most favorable results will be obtained by cycling the reaction mixture through a colloid mill and back to the reactor during the course of the reaction. The colloid mill is set to scour the particles passing through it, and this type of mill will usually not reduce or grind the aluminum metal but it may change its shape to give metal of larger surface area. Alumina around the metal may be scoured from the particles affording an overall size reduction and exposing metal surface for further reaction and/or reducing the amount of alumina to decrease the diffusion barrier. Most present colloid mills have a minimum clearances of about 0.001 inch (about 25 microns) and the mill is preferably adjusted to the minimum clearance compatible with a reasonable flow through the device. Such adjustment may be on the order of slightly more than the size of the largest particles present. For example, if the largest particles are on the order of about 60 microns in size, initial setting of the colloid mill may be about 0.003 inch (75 microns). Setting of the clearance at less than the largest particle diameter might result in damage to the stator and rotor of the colloid mill by scoring. As the size of the particles is reduced by repeated passage through the mill and reactor, the clearances may be correspondingly reduced. The colloid mill is more efficient the closer the clearance, so that usually the clearance is set no higher than 1½ times the size of the largest particles. The alumina hydrate may have a secondary lubricating effect on the mill which prevents seizure at such low clearances. Of course, the greater the amount of coarse particles in the aluminum starting material, the greater the amount of colloid milling that may be required. Although use of the colloid mill is preferred other scouring devices may be employed. For instance, a ball mill could serve to scour even though it might serve also to grind the metal itself to smaller size.

Usually, the slurry from the reactor is pumped through the mill system for a period of time varying from about 5 minutes to several hours, for instance, with the colloid mill set as described in the preceding paragraph. The type of mill, length of time and number of slurry passes through the mill and also the frequency of passage through the mill will often be determined by the operator according to the situation he faces. The extent of operation of the mill will usually be such as to provide at least about 10 batch passages through the mill. The size of the batch is considered to be the volume of the total reaction mixture. Although there is no particular harm in passing the batch through the mill as long as desired, no reason appears to have more than about 200 passes.

As mentioned, the processing steps of this invention are of value in conjunction with processes described in the cited copending applications. In both of these processes, aluminum in a state of extremely fine subdivision and high surface area is contacted with water under a given set of circumstances. The aluminum metal employed as a starting material, has a surface area of about 75 thousand to 1 million square millimeters per gram, preferably about 150,000 to 600,000 mm.$^2$/gm., and often is in a general particle size range of about 2 to 100 microns.

In application Ser. No. 416,891, now Patent No. 3,429,660, a lower fatty acid is supplied to the reaction between aluminum and water, and the reaction may take place at a pH below about 4.1, generally between about 3 and 4. A non-oxidizing acid, generally formic acid, is employed, at a rate of about 1 mole of acid/2–30 gram atoms of aluminum/at least about 18 moles of water. Preferably about one mole formic acid is used for each 5–15 gram atoms of aluminum and each 100–750 moles of water. Reaction conditions generally include a temperature of about 60–250° C. preferably about 90–100° C., and up to about 500 pounds pressure, preferably atmospheric pressure, and the reaction usually is continued until a concentration of about 5–12% alumina is achieved in the mixture. The aluminum and acid may be added to the reaction mixture in increments in amounts to maintain the stated ratios, pH, and other conditions essentially throughout the reaction.

In application Ser. No. 416,902 hydrous alumina predominating in alumina trihydrate phases is prepared by reaction at a basic pH, preferably higher than about 9.6. The reaction generally takes place at elevated temperatures, greater than about 50° C., up to about 250° C., with about 55–85° C. being preferred. Although the aluminum metal itself when first reacted may impart a basic pH to the aqueous medium, an extraneous material such as alkali metal, ammonium, or ammonium derivative hydroxides, chlorides or salts of lower fatty acids may be added to insure advantageous reaction conditions. The reactants are generally supplied in the amount of at least about 3 moles of water per gram atom of aluminum per 0 to 0.05 mole of extraneous reagent. Preferably, about 6 to 35 moles of water are supplied per gram atom of aluminum. The reaction is usually continued to give a slurry containing about 10–30% alumina, preferably about 15 to 25% alumina. The reaction may be conducted by adding incremental portions of aluminum metal to the water, each portion comprising less than about 75% of the total aluminum employed and the reaction of a preceding portion being allowed to go to at least about 75% completion before a subsequent portion is added. Preferably, each aluminum portion is less than about 60% of the total and 90% of the preceding portion is reacted before a subsequent portion is added.

The invention will be better understood by reference to the accompanying drawing in which the sole figure is a schematic representation of apparatus which can be employed in performing the process of this invention.

In the drawing, 11 represents a reactor tank having the agitator 13 fastened to the rotatable shaft 15. The reactor tank is provided with the upper inlets 18, 20 and 22 and the lower outlets 25 and 28. Outlet 28 leads to a pump, preferably the centrifugal pump 30 which has the outlet 33, which in turn leads to the colloid mill, indicated generally by 36.

The colloid mill used in this invention may advantageously be a Charlotte-type colloid mill. Such a mill has the inlet chamber 40 leading to an adjustably narrow annular passage 42 between a conical rotor 44 and a stator 46. The rotor 44 is operated by the shaft 48 and the annular passage 42 leads to the mill outlet 50 connected to the reactor inlet 22.

The reactor vessel 11 may be provided with an additional lower outlet where it is desired to allow settling in the reactor itself at the end of the reaction. This outlet provides for removal of the heavier layer. Preferably, the product outlet 25 from the reactor leads to a separate decantation or settling vessel 52 which can have a lower outlet 55 for the heavy unreacted aluminum powder and an upper outlet 57 for product colloidal alumina hydrate.

In the process of this invention, the inlets 18 and 20 may be used, interchangeably if desired, for the induction to the reactor vessel of water, metallic aluminum and other materials used in the reaction. The aluminum is often fed to the reaction as a slurry in water. During, or at the end of the reaction period, pump 30 may be operated intermittently or continuously to send portions of the mixture in the reactor to and through the colloid mill and back to the reactor through the inlet 22.

The following examples illustrate the process of this invention but should not be considered limiting. The aluminum used in each of these examples had a sieve analysis as follows:

|  | Percent |
|---|---|
| +200 | 0 |
| 200–230 | 14 |
| 230–270 | 8 |
| 270–325 | 14 |
| –325 | 64 |

It will be noted that about 36% of the particles fail to pass a 325 mesh sieve. The colloid mill clearance was set at 0.001–0.003 inch equivalent to a particle size of about 25–75 microns.

EXAMPLE I

To a 50 gallon reactor fitted with a high-speed two-bladed agitator, a reflux condenser and a thermo-regulator, was added 45 gal. of deionized water and, over a period of about 8 hours, 1700 ccs. of 88% formic acid and 14.25 pounds of atomized aluminum metal of the size range described above as about a 20% slurry in water. The formic acid solution was added continuously at a rate of about 3.5 cc./min. The reaction started at ambient temperature, the temperature increasing to about 100° C. About two hours after the last addition of aluminum, a conversion of about 92.4% had been attained and the reaction appeared to stop. More than 1% of aluminum-containing particles larger than 50 microns in size remained in the slurry. The centrifugal pump and colloid mill were then started and run at 5 gallons per minute for 30 minutes. The batch turnover, therefore, was about 3 during this run. This procedure was followed for a total milling period of about five hours. The initial mill clearance of about three mils was gradually reduced to about one mil as the maximum particle size diminished. Besides giving a cleaner separation by decantation, that is, giving a hydrate product containing little aluminum and little loss of hydrate in the aluminum layer, this procedure served to increase the conversion level. At the end of the run 99.2% of the aluminum had been converted to hydrous oxide and substantially no particles greater than 44 microns remained.

EXAMPLE II

In another run, conducted under alkaline conditions, a charge to the reactor of 36.5 pounds aluminum of the above description, 45 gallons (375 pounds) deionized water and 500 cc. 29% aqueous ammonia (gravity 0.90) were mixed together at once. Reaction at about 75° C. continued for about 20 hours, at which time conversion was 91.4% and the reaction rate markedly dropped. The reaction mixture still had more than 1% aluminum-containing particles greater than fifty microns in size. The Charlotte Colloid Mill was introduced into the system, at a rate of 5 g.p.m. and an initial mill clearance of about 0.003 inch. After the end of two hours, 45 minutes, (a total of about 16–17 tank-turnovers) the conversion was 98% and substantially no particles greater than 44 microns remained. The run was terminated at this point, and reaction product was separated by decantation from still remaining unreacted aluminum.

It is claimed:

1. A method which consists essentially of reacting water and finely divided aluminum in a system consisting essentially of water and finely divided aluminum of about 2 to 100 microns in size and having a surface area of about 75,000 to 1,000,000 square millimeters per gram to form a reaction mixture containing hydrous alumina and at least 5 weight percent of solid aluminum-containing particles having a size larger than 50 microns and up to about 100 microns, withdrawing a portion of said reaction mixture from the reaction zone, subjecting withdrawn reaction mixture to scouring and returning scoured reaction mixture to said reaction zone, said withdrawing, scouring and returning being conducted until substantially all particles in the reaction mixture have a size less than 50 microns, and the resulting reaction mixture is essentially free of unreacted aluminum.

2. The method of claim 1 in which the aluminum starting material has more than about 5% of the particles of which fail to pass a 325 mesh sieve.

3. The method of claim 1 in which the mixture is scoured by passage through a colloid mill.

4. The method of claim 3 in which the colloid mill has a clearance of about 0.001 to 0.003 inch.

5. The method of claim 4 in which the reaction with water takes place at a basic pH.

6. The method of claim 4 in which the reaction with water takes place at an acid pH.

7. The method of claim 1 in which the scouring is conducted in a colloid mill and scouring is continued until less than 1% of the particles in the reaction mixture are larger than 44 microns in size.

8. The process of claim 7 in which the aluminum starting material has more than about 5% of the particles of which fail to pass a 325 mesh sieve.

9. The process of claim 8 in which the scouring by colloid milling is continued until the volume of reaction mixture scoured is at least about 10 times the volume of the total reaction mixture.

10. The process of claim 9 in which the reaction is conducted at a temperature of about 90 to 100° C. and the reaction mixture contains about 1 mole of formic acid per 2 to 30 gram atoms of aluminum per at least about 18 moles of water.

11. The method of claim 9 in which the reaction is conducted at a pH higher than about 9.6 provided by the presence of ammonium ions at a temperature of about 55 to 85° C. and at a ratio of at least about 3 moles of water per gram atom of aluminum.

12. The process of claim 9 in which the reaction mixture contains more than 1 weight percent of aluminum-containing particles having a size greater than about 74 microns.

13. The process of claim 12 in which the aluminum starting material has a surface area of about 150,000 to 600,000 square millimeters per gram.

References Cited

UNITED STATES PATENTS

| | | | |
|---|---|---|---|
| 1,196,806 | 11/1933 | Thomas | 23—66 |
| 2,590,833 | 4/1952 | Bechtold et al. | 23—143 |
| 2,915,475 | 12/1959 | Bugosh | 23—143 X |
| 3,357,791 | 12/1967 | Napier | 23—143 |
| 2,258,099 | 10/1941 | Patrick | 23—143 |
| 2,336,597 | 12/1943 | Connolly | 23—143 X |
| 2,758,011 | 8/1956 | Bloch | 23—143 |
| 3,003,952 | 10/1961 | Cramer et al. | 252—466 X |
| 3,222,130 | 12/1965 | Hauschild | 23—143 |

OSCAR R. VERTIZ, Primary Examiner

G. T. OZAKI, Assistant Examiner

U.S. Cl. X.R.

252—463

UNITED STATES PATENT OFFICE
CERTIFICATE OF CORRECTION

Patent No. 3,488,147　　　　　　　　Dated January 6, 1970

Inventor(s) Carl D. Keith and Kurt W. Cornely

It is certified that error appears in the above-identified patent and that said Letters Patent are hereby corrected as shown below:

References: Column 6, line 32, delete "1,196,806" and insert therefor -- 1,936,806 --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents